(No Model.)

N. NIEF & P. COTTE.
LINE OR ROPE HOLDER.

No. 449,567. Patented Mar. 31, 1891.

WITNESSES:
William Miller
Edward Wolff

INVENTORS
Nicolas Nief
Pierre Cotte.
by
Van Santvoord & Hauff
ATTORNEYS

UNITED STATES PATENT OFFICE.

NICOLAS NIEF AND PIERRE COTTE, OF WEST HOBOKEN, NEW JERSEY.

LINE OR ROPE HOLDER.

SPECIFICATION forming part of Letters Patent No. 449,567, dated March 31, 1891.

Application filed January 3, 1891. Serial No. 376,644. (No model.)

*To all whom it may concern:*

Be it known that we, NICOLAS NIEF and PIERRE COTTE, both citizens of the United States, residing at West Hoboken, in the county of Hudson and State of New Jersey, have invented new and useful Improvements in Line or Rope Holders, of which the following is a specification.

This invention has for its object to provide a novel line or rope holder adapted to be secured to one end of a line or rope and having a guide-eye for the passage of the opposite end of the line or rope to a rotating toothed drum acting in connection with a projection to secure the free end of the line or rope, the construction being such that the end portion of the line or rope to be secured by the toothed drum is guided and supported by the guide-eye, and thereby prevented from disengaging the drum. To accomplish this object, our invention involves the features of construction and the combination or arrangement of devices hereinafter described and claimed, reference being made to the accompanying drawings, in which—

Figure 1:
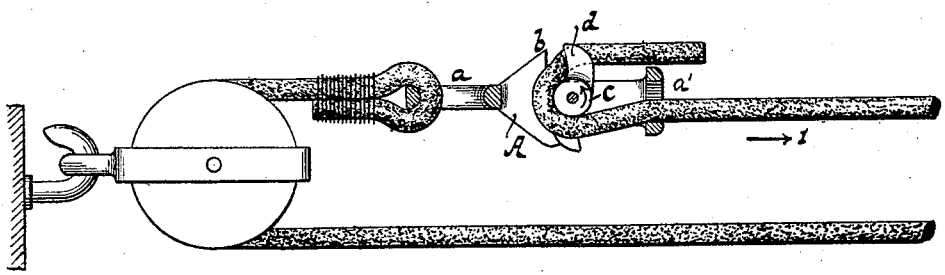
Figure 2:
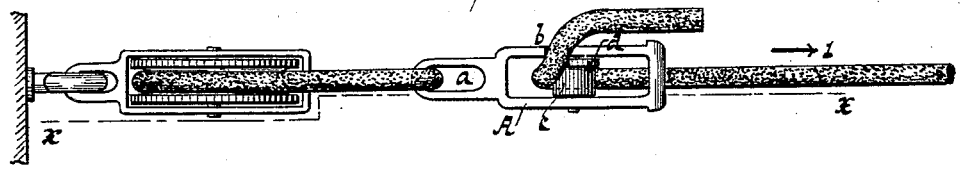
Figure 3:
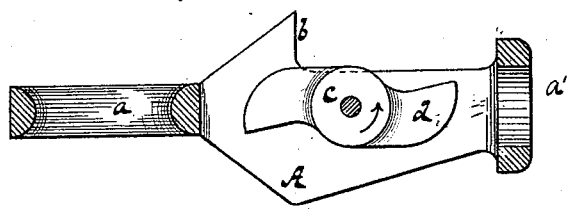
Figure 4:
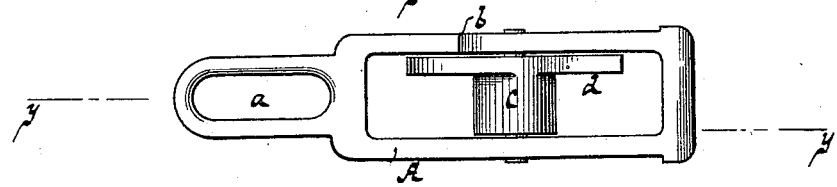

Figure 1 represents a longitudinal section of our line or rope holder as applied to a clothes-line, the plan of section being indicated by the line $x\,x$, Fig. 2. Fig. 2 is a plan view of the same. Fig. 3 is a longitudinal section of the line-holder on a larger scale than the previous figures, the plan of section being indicated by the line $y\,y$, Fig. 4. Fig. 4 is a plan view of the same.

In the drawings, the letter A designates a frame or housing which is provided at one extremity with an eye $a$, in which one end of the line or rope is secured, as shown in Fig. 1, while the opposite extremity of the frame or housing is provided with a guide-eye $a'$ in the form of a ring, with its passage-way or orifice at right angles to the passage-way or orifice constituting the eye $a$. On said housing is formed a shoulder $b$, and in the same is mounted a cylindrical drum $c$, which revolves freely. In the example shown in the drawings the drum $c$ is mounted on a pin or axle, which has its bearings in the cheeks of the housing, such pin or axle of the drum being arranged between the eye $a$ and the ring-guide $a'$ in such manner that one end portion of a line or rope inserted through the ring-guide will pass beneath the periphery of the cylindrical portion of the drum and can then be bent laterally in front of the projecting shoulder $b$. From the drum $c$ projects a toe $d$, and if the drum is turned in the direction of the arrow marked on it in Figs. 1 and 3 the edge of the toe $d$ moves toward the edge of the shoulder $b$. In the example represented by the drawings the drum is provided with two toes which project in opposite directions; but only one of these toes is brought in operation at one and the same time. The free end of the rope or line is passed through the ring-guide $a'$ and drawn beneath the drum $c$ and thence out of the housing, so that the line rests against the shoulder $b$, while the line or rope in advance of the drum is supported by the ring-guide $a$, whereby such advance portion of the line or rope cannot be moved laterally out of engagement with the periphery of the drum. If a strain is exerted on the line in the direction of arrow 1, Figs. 1 and 2, the drum $c$ is caused to turn by frictional contact with the line in the direction of the arrow marked on it in Figs. 1 and 3, and that portion of the line which rests against the shoulder $b$ is firmly clamped between the toe $d$ and said shoulder.

What we claim as new, and desire to secure by Letters Patent, is—

A line or rope holder consisting of the housing having at one end an eye and at the opposite end a ring-guide and intermediate such eye and ring-guide provided with a laterally-projecting shoulder, and a rotating cylindrical drum having its axis in line with the orifice of the ring-guide and provided with a projecting tooth, whereby the eye serves for the attachment of one end of a line or rope and the ring-guide serves to support and guide the opposite end portion of the line or rope in advance of the rotating drum, substantially as described.

In testimony whereof we have hereunto set our hands in the presence of two subscribing witnesses.

NICOLAS NIEF.
PIERRE COTTE.

Witnesses:
WILLIAM C. HAUFF,
E. F. KASTENHUBER.